United States Patent
Franzan

(10) Patent No.: US 7,346,272 B2
(45) Date of Patent: Mar. 18, 2008

(54) ANTI-TRAP PROTECTION DETECTION BASED ON COMPARING THE DUTY CYCLE OF A PWM CONTROL SYSTEM

(75) Inventor: Günter Franzan, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 68 days.

(21) Appl. No.: 11/426,477

(22) Filed: Jun. 26, 2006

(65) Prior Publication Data

US 2007/0003258 A1    Jan. 4, 2007

(30) Foreign Application Priority Data

Jun. 30, 2005   (DE)   ............ 10 2005 030 600

(51) Int. Cl.
   *H02P 7/00*   (2006.01)
(52) U.S. Cl. .......... 388/800; 318/825; 318/803; 318/816; 318/904; 318/906
(58) Field of Classification Search ........ 388/803, 388/816, 800, 825, 904, 906
   See application file for complete search history.

(56) References Cited

U.S. PATENT DOCUMENTS

| | | | |
|---|---|---|---|
| 5,764,008 A | | 6/1998 | Hahn et al. ............ 318/256 |
| 5,770,934 A | * | 6/1998 | Theile ................ 318/469 |
| 5,789,887 A | * | 8/1998 | Elischewski .......... 318/468 |
| 5,847,524 A | * | 12/1998 | Erdman et al. ........ 318/439 |
| 6,164,015 A | | 12/2000 | Kawanobe et al. ....... 49/360 |
| 6,870,339 B2 | * | 3/2005 | Kessler et al. ......... 318/468 |
| 7,138,783 B2 | * | 11/2006 | Ran ................... 318/653 |
| 7,208,897 B2 | * | 4/2007 | Hotto et al. ........... 318/466 |
| 2005/0184694 A1 | * | 8/2005 | Kalb et al. ............ 318/452 |

FOREIGN PATENT DOCUMENTS

| | | |
|---|---|---|
| DE | 19507541 | 2/1996 |
| DE | 19700828 | 7/1998 |
| DE | 10325890 | 12/2004 |
| EP | 0999298 | 9/1999 |
| EP | 1607562 | 6/2005 |

* cited by examiner

*Primary Examiner*—Rita Leykin
(74) *Attorney, Agent, or Firm*—Baker Botts L.L.P.

(57) ABSTRACT

In order to create a method and an apparatus for anti-trap protection detection for displaceable window and door elements by means of which faster and more stable adjustment to current physical conditions can be achieved during system actuation, in the system the motor (1) is controlled using parameter values generated in real-time using a closed-loop control unit, preferably a PID controller, to keep the speed in the system constant during a learning run and during operational use and to ensure timely trapping detection.

19 Claims, 1 Drawing Sheet

ANTI-TRAP PROTECTION DETECTION BASED ON COMPARING THE DUTY CYCLE OF A PWM CONTROL SYSTEM

PRIORITY

This application claims priority from German Patent Application No. DE 10 2005 030 600.4, which was filed on Jun. 30, 2005, and is incorporated herein by reference in its entirety.

TECHNICAL FIELD

The invention relates to a method for controlling a displacement element such as a vehicle window, a sunroof, a lift gate, a vehicle door or the like by means of a motor, preferably a DC motor, wherein parameter values, preferably in the form of a characteristic curve, which are stored by means of a learning run are compared with parameter values generated in real-time during operation of the motor and required for controlling same and as a function of which the motor is stopped or its rotational direction is reversed, and an apparatus for carrying out said method, and a method for generating parameter values of a learning run.

BACKGROUND

Automatic displacement elements are used in a wide variety of applications to enable the user to operate windows, doors and other closing devices conveniently and easily. For this purpose a DC motor is generally used which serves to drive the displacement element via an appropriate mechanism. Particularly in the automotive field, automatic window lifts and sunroofs as well as doors and lift gates have become commonplace and are already being fitted as standard in the vast majority of new cars.

However, particularly in the automotive field, the potential hazard of electric window lifts or sunroofs is already well recognized also, as numerous accidents involving them have already been recorded and given extensive media coverage.

If, for example, an object or body part is trapped between vehicle frame and electrically operated window or door, it may be subject to adverse effects or crushing because of the not inconsiderable motive force of the power actuator. Children, dogs or even adults can be injured by accidental actuation of electrical closing devices, such accidents even proving fatal in extreme cases. This is particularly the case with an automatic up/down feature whereby a brief touch of the switch suffices to open or close a window automatically. Tests have found that a closing force of even 100 Nm acting on the human neck can be life-threatening, and for small children the danger limit is as low as 30 Nm.

The experience of recent decades has therefore made it necessary to create devices for limiting the closing force, i.e. providing anti-trap protection, in order to stop the closing movement of motor-driven elements such as windows and doors if necessary and prevent such accidents from occurring. Although an EU directive specifies limiting the force of window lifts to 100 Nm, many automobile manufacturers are voluntarily aiming for a limitation to 10 Nm in order to make sure that any kind of crushing of fingers or other extremities is eliminated.

For this purpose any resistance to the closing movement of the window is registered by an open-loop controller, causing the motor-driven closing movement to be stopped or, in the case of intelligent control, even reversed by reversing the motor direction so that the trapped object or body part is immediately released. The window or door closing movement therefore lasts only until such time as an obstacle gets in the way.

A resistance is mainly detected by means of computer-assisted analysis of the motor current. If an object impedes the movement of the window pane, the motor is slowed down and the motor current increases. In such cases the controller which is measuring the motor current interrupts the supply of current or causes the displacement element, i.e. the window pane, to return in the opposite direction by reversing the polarity at the terminals of the DC motor via a suitable circuit.

Particular requirements are also placed on the software components of closed-loop control units, as the control system must not only detect a real obstacle, but also differentiate it from a defect such as icing-up or sticking of the power window due to dirt. Since in the latter case the resistance occurring must be overcome and the control unit must not be "fooled" by changing operating and environmental conditions, precisely operating and intelligent software solutions are required.

For driving window lifts, sunroofs, lift gates and other movable elements (hereinafter referred to globally as displacement elements), DC motors are normally used, whereby there is mounted on a motor shaft an at least two-pole rotor by means of whose rotation the motor's rotary motion is converted via Hall sensors into a Hall signal which is in turn used for speed calculation. The Hall sensor is a semiconductor device which produces a voltage as the result of current flow and an external magnetic field, said voltage increasing with the intensity of the current flow and the magnetic flux density.

As the Hall sensor changes its voltage level more quickly the faster the motor shaft rotates, the speed of the displacement element during its translational opening or closing movement can be determined, the motor speed being dependent on the voltage present and the necessary force which the motor must exert to produce the desired movement of the displacement element. Due to changing operating conditions such as temperature, gearing and various frictional resistances caused in particular by rubber seals, the force required to move the displacement element varies, which causes the speed of the system to vary while the voltage dropped across the motor remains constant.

As it is desired on the part of the industry to keep the displacement element speed constant throughout the opening and closing movement, the voltage applied to the motor is varied accordingly. In practical terms this means that the voltage must be increased equivalently the more force the motor requires to maintain the desired speed even under changed conditions. For this purpose the system is clocked via pulse width modulation (PWM), the input voltage supplying the motor being switched on and off at a high frequency of normally 20 kHz in short variable cycles. These cycles are termed the switching period $T_s$, the ratio of the on-time $t_{on}$ to the off-time $t_{off}$ during such a switching period $T_s$ being variable as required.

If the on-time $t_{on}$ is increased, a larger arithmetic mean of the output voltage and therefore a higher output current is produced. In technical terms this is also known as a "duty cycle", whereby if the on-time $t_{on}$ and off-time $t_{off}$ are of equal length a duty cycle of 50% is present, which means that the input voltage is also halved. If the on-time $t_{on}$ is only a quarter of the switching period $T_s$, this is termed a duty cycle of 25% with consequently only a quarter of the input voltage being applied to the motor. The duty cycle and therefore the output of the motor is continuously controllable from 0 to 100%.

In known methods according to the prior art, the required displacement force which the motor needs to move the displacement element is calculated via the voltage and speed of the motor and stored in a nonvolatile memory. For this purpose a learning run is executed subject to clocking by means of constant PWM in order to determine the various frictional forces occurring in the system over the movement range of the displacement element. The frictional forces result primarily from the contact of the displacement element with seals and other mechanical transitions.

A learning run is necessary for each individual closing system because, in spite of standardization and mass production, every mechanical system proves to be unique and possesses individual characteristics which means that, due to manufacturing tolerances in the mechanism, it also does not behave in the same way in terms of its movement. Thus prior to initial commissioning of a new system, a one-off learning run is therefore performed and the characteristic data obtained is stored as a frictional or displacement force curve in order to then serve as a reference for all subsequent closing movements of the displacement element during normal operation.

For all the closing movements taking place in the future, the required PWM clocking is determined by means of complicated calculations on the basis of motor voltages and the associated stored reference data concerning the displacement forces which is obtained during the learning run in order to enable the different mechanical forces present at various points in time to be compensated. Comparison of the reference data with the forces currently present during a closing movement of the displacement element finally allows an object or body part to be detected and suitable control pulses to be triggered in order to stop the closing movement or reverse it by reversing the polarity of the direction of the motor. In practical terms, the exceeding of a particular permissible displacement force is therefore computationally registered and the motor drive is controlled accordingly in order to release the trapped object, the duty cycles for controlling the motor with constant speed being calculated on the basis of the characteristic values obtained from the learning run according to the displacement forces and not on the basis of the current speed actually occurring in the system.

As the learning run merely constitutes a simulation of the movement sequence of the displacement element as it occurs under learning run conditions (in the laboratory, workshop, etc.), but cannot allow for any current operating conditions and environmental effects present at the time of any displacement movements occurring subsequent to the learning run under real environmental conditions, it is also realistically impossible to match the speed to new circumstances.

One of the disadvantages of this method is that the reference data obtained during the learning run is also used as reference for all movements of the displacement element taking place in the future and the speed of the system is always reproduced in a rigid manner according to the calculation performed for the learning run. As the system's mechanism is subject to aging and changing environmental and operating conditions such as increased dust and temperature exposure, the speed of the displacement element cannot be kept constant and tends to vary from one path section to another, which also makes it difficult to define a precise closing force limitation, with the result that extremities trapped by the displacement element may in some cases suffer slight injury even with anti-trap protection provided. The irregularity of the displacement movement is likewise accompanied by undesirable audible and visual characteristics.

Moreover, the data recognition algorithm cannot reliably reflect all the operating ranges and physical conditions, such as changes resulting from mechanical aging, and requires complex adjustments for the simulation of same.

SUMMARY

The object of the present invention is therefore to avoid these disadvantages and to create a method and an apparatus for controlling a displacement element whereby quicker and more stable adjustment to suit current physical conditions can be achieved during system actuation. In addition, the method and apparatus according to the invention are designed to ensure a uniform speed of the displacement element throughout its movement, irrespective of the current operating conditions. The measures according to the invention are designed to provide anti-trap protection detection which is characterized by direct and realistic data utilization in order to enable the displacement mechanism to react rapidly and effectively in hazardous situations.

This object can be achieved by a method for controlling a displacement element such as a vehicle window, a sunroof, a lift gate, a vehicle door or the like by means of a motor, preferably a DC motor, the method comprising the step of comparing parameter values, preferably in the form of a characteristic curve, which are stored by means of a learning run with parameter values generated in real-time during operation of the motor and, depending on the result of the comparison, stopping the motor or reversing the motor rotational direction, wherein the speed of the motor is kept constant allowing for the mechanical forces actually occurring on the displacement element at the time of motor actuation and the parameter values generated in real-time are the result of closed-loop speed control causing the speed to remain constant and are used for controlling the motor.

The parameter values generated in real-time can be the ratio of the on-time of the motor to the off-time of the motor. If a defined difference between the stored parameter values and the parameter values generated in real-time is exceeded, the motor can be stopped and its drive motion can be preferably put into reverse. The parameter values stored by means of a learning run can be the ratio of the on-time of the motor to the off-time of the motor. The speed of the system can be maintained constant throughout the learning run.

The object can also be achieved by an apparatus for controlling a displacement element such as a vehicle window, a sunroof, a lift gate, a vehicle door or the like by means of a motor, preferably a DC motor, an open-loop control unit for motor clocking and a characteristic handler as well as a nonvolatile memory in which parameter values, preferably in the form of a characteristic curve, obtained in the course of a learning run are stored, wherein the open-loop control unit is preceded by a closed-loop control unit which causes the motor to operate at constant speed, the characteristic handler continuously comparing the parameter values of the open-loop control unit that are critical for motor control with the parameter values stored in the nonvolatile memory. The closed-loop control unit may comprise a PID controller.

The object can also be achieved by a method for generating parameter values of a learning run for use in the above mentioned method or apparatus, wherein the speed of the motor can be kept constant by means of a closed-loop control unit, preferably a PID controller.

The travel path of the displacement element can be subdivided into a plurality of sections within which an average of the parameter values required for controlling the motor while its speed is maintained constant is calculated, the difference between the current parameter value and the previously stored parameter value being stored in the nonvolatile memory at the end of the section. The totality of all the stored parameter values can be stored as a characteristic in the nonvolatile memory. The parameter values can be the ratio of the on-time of the motor to the off-time of the motor.

Whereas open-loop motor control systems according to the prior art use stored parameter values, namely the above-described displacement force characteristic, in order to control the motor via complicated calculations so that it runs at a constant speed, in the method according to the invention the motor speed is closed-loop controlled using parameter values generated in real-time and which allow for the displacement forces actually required.

The speed of the motor is kept constant taking into account the mechanical forces actually occurring on the displacement element at the time of motor actuation, the parameter values generated in real-time being the result of closed-loop speed control causing the speed to remain constant and being used for controlling the motor.

For this process a closed-loop control unit is used, preferably a PID controller which keeps the rotation speed constant during the learning run and also during operational use. By means of said closed-loop control unit, the output of the motor and therefore the closing speed of the displacement element can now be quickly and reliably adapted to actual higher frictional resistances which in the case of a car window lift occur primarily at the beginning and end of a closing movement as a result of contact between the glass and the window sealing lips, the closed-loop control unit causing an open-loop control unit to generate the parameter values required for controlling the motor. In this way a duty cycle meeting the stated requirements can be provided.

Obviously, instead of the PID controller other closed-loop control systems can likewise be used for the purpose of speed regulation such as proportional and integral controllers together with their modifications and control circuits specifically designed to solve a particular problem, without departing from the inventive idea.

According to the characterizing feature of claim 2, the parameter values generated in real-time for controlling the motor output are registered in the form of duty cycle values which are stored preferably as a duty cycle characteristic corresponding to the sluggishness or ease of movement of the displacement element as a result of the frictional resistance. As already explained above, the duty cycle is the ratio of the on-time of the motor to the off-time of the motor or, more precisely, the ratio of the on-time $t_{on}$ to the switching period $T_s$, said switching period $T_s$ comprising one cycle of off-time $t_{off}$ and on-time $t_{on}$. By means of appropriate variable clocking of the motor, a constant speed of the displacement element during its actuation can thus be achieved in spite of the different displacement forces required. This speed homogenization also provides auditory benefits, as the closing noise of the displacement element is now more evenly spread. Likewise the sight of a displacement element moving at a uniform speed is more visually acceptable particularly in the case of a car window lift.

As a result of the characterizing features of claim 3, the motor is stopped and its drive direction preferably reversed if a defined difference between the stored parameter values and the parameter values generated in real-time is exceeded. In this way, an object or body part trapped by the displacement element can be detected in a direct and reliable manner.

By comparing the duty cycle characteristic currently being obtained with the characteristic already correctly stored during the learning run in respect of a constant speed, any obstruction in the path of the displacement element can be detected more quickly and more reliably. As there is now no need to calculate displacement forces required to overcome frictional resistances, the duty cycle set by the PWM controller can be compared directly with the values from the characteristic obtained in the learning run.

According to the characterizing features of claim 4, the parameter values stored by means of the learning run are likewise the ratio of the on-time of the motor to the off-time of the motor, i.e. they are duty cycle values or a duty cycle characteristic. Directly comparing duty cycle values or characteristics permits direct data analysis using a simpler algorithm than that used in existing known methods according to the prior art. Any desired system speed can be defined, which means that an atypical or arbitrary speed characteristic can also be generated if required for particular applications.

Even during the learning run the speed of the system is controlled in accordance with the characterizing features of claim 5 in order to maintain it constant and thus obtain a realistic characteristic in respect of the displacement element's closing speed which is used as a reference for all subsequent closing movements. For all other closing movements of the displacement element following the learning run the speed is again maintained constant via the closed-loop control unit and the currently obtained duty cycle is compared directly with the stored duty cycle by a characteristic handler.

The characterizing features of claims 6 and 7 apply to an apparatus arrangement for implementing the described method, claim 6 providing that the open-loop control unit clocking the motor is preceded by a closed-loop control unit which causes the motor to be operated at constant speed, there being provided a characteristic handler which continuously compares the open-loop control unit's parameter values critical for motor control with the parameter values stored in a nonvolatile memory. The characteristic handler is disposed in a superordinate manner to all the other open- and closed-loop control units and can directly check the motor output control at any time in order to take the described action to stop the motor or reverse the drive motion.

According to the characterizing features of claim 7, the closed-loop control unit described comprises a PID controller. By providing a permanently active PID controller, a desired speed of the displacement element can always be adjusted to suit the circumstances even after modification of the mechanism as the result of aging or changed operating conditions and kept constant at all times. In accordance with the comments made in connection with claim 1, it is self-evident that other closed-loop control systems can likewise be used in place of the PID controller without departing from the inventive concept.

The apparatus according to the invention permits a simpler and direct data computation algorithm and the quality of the anti-trap protection can be set by means of the PID controller via the accuracy of the speed control system. This means that, the more accurately the PID controller is set, the more quickly it is possible to react to speed changes as the result of trapping. Any crushing of limbs can be reliably eliminated by accurate setting of the closed-loop control unit.

The characterizing features of claims 8 to 11 describe a method corresponding to the preceding claims for generating parameter values of a learning run.

In accordance with the characterizing features of claim 8, the motor speed is kept constant during the characteristic-determining process by means of a closed-loop control unit, preferably a PID controller. In contrast to the prior art where a force profile over the travel path of the displacement element is stored before a duty cycle is calculated therefrom, with the system according to the invention a duty cycle corresponding to the frictional forces occurring is generated as early as the learning cycle with the speed already being kept constant. Consequently, in accordance with the characterizing features of claim 9, a plurality of duty cycle values corresponding to different sections of the path traversed by the displacement element during its closing movement are calculated, an average of those parameter values required for controlling the motor while its speed is kept constant being calculated. For this purpose, at the end of each section the difference between the current parameter value and the previously stored parameter value is stored in the nonvolatile memory.

In accordance with the characterizing features of claim 10, the totality of all the stored parameter values, which are likewise duty cycle values in accordance with the characterizing feature of claim 11, are stored as characteristics in the nonvolatile memory. In practical terms this provides a ready-made predefined duty cycle for controlling the motor with constant speed while allowing for the specific mechanical properties of the system.

BRIEF DESCRIPTION OF THE DRAWINGS

The invention will now be explained in greater detail with reference to an exemplary embodiment in which.

DETAILED DESCRIPTION

Figure 1:
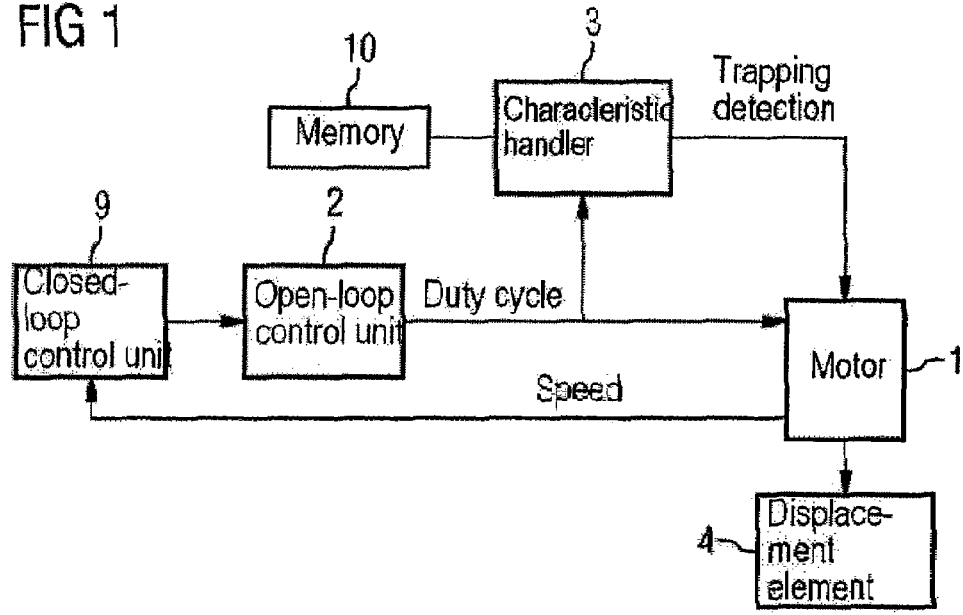
FIG. 1 schematically illustrates a control circuit according to the invention

FIG. 1 shows a control circuit as used in the method according to the invention, comprising a motor 1, a closed-loop control unit 2 and a characteristic handler 3. In this system the motor 1 is used to drive a displacement element 4 via an intermediate mechanism (not shown). The displacement elements 4 are openable and closable windows, doors or other closing devices, the use of the system according to the invention in the automotive industry being described in the present application with particular reference to power windows or sunroofs. However, the system according to the invention can also be used just as well, and prove advantageous, in building and gardens, for garage doors or automated closing devices generally.

Figure 2:
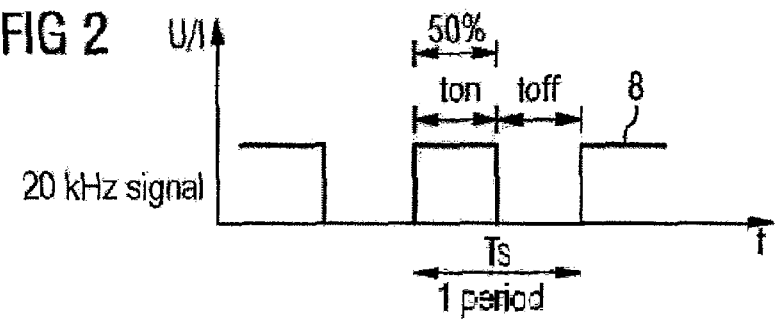
FIG. 2 shows pulse width modulation (PWM) clocking of the system FIG. 3 schematically illustrates a duty cycle

The illustrated combination shows that the motor 1 is clocked mainly by means of pulse width modulation (PWM) via the open-loop control unit 2 (see FIG. 2). Output control by means of PWM allows the displacement force and speed required on the part of the motor to move the displacement element 4 to be randomly controlled. For this purpose the input voltage supplying the motor is switched on and off at high frequency in brief switching periods $T_s$ in the known manner. By extending the on-time $t_{on}$ a larger arithmetic mean of the output voltage and therefore a larger output current is achieved. The output of the motor is continuously controllable from 0 to 100% via this ratio known as a "duty cycle". Purely by way of example, FIG. 2 shows the resulting square-wave signal 8, the on-time $t_{on}$ here accounting for 50% of the switching periods $T_s$, i.e. a duty cycle of 50%.

According to the invention, a closed-loop control unit 9 is used which keeps the speed in the system constant during a learning run and also during operational use. Although in the example a PID controller is proposed as closed-loop control unit because of its optimum and rapid control characteristics, another kind of controller can likewise also be employed. The PID controller reacts quickly and reliably to effective higher frictional resistances which the displacement element 4 has to overcome especially at the beginning and end of a closing movement as a result of mechanical transitions and adapts the output of the motor in such a way as to ensure a constant closing speed of the displacement element 4.

The learning run must be carried out prior to initial commissioning of a new system, as each individual mechanical system always possesses a certain range of uncertain parameters and an individual characteristic as a result of manufacturing. The obtained parameter values characterizing the particular mechanical system according to the frictional resistances are stored as a duty cycle characteristic 5 in a nonvolatile memory 10 in order to serve as reference for all future closing movements of the displacement element 4 during operational use.

Figure 3:
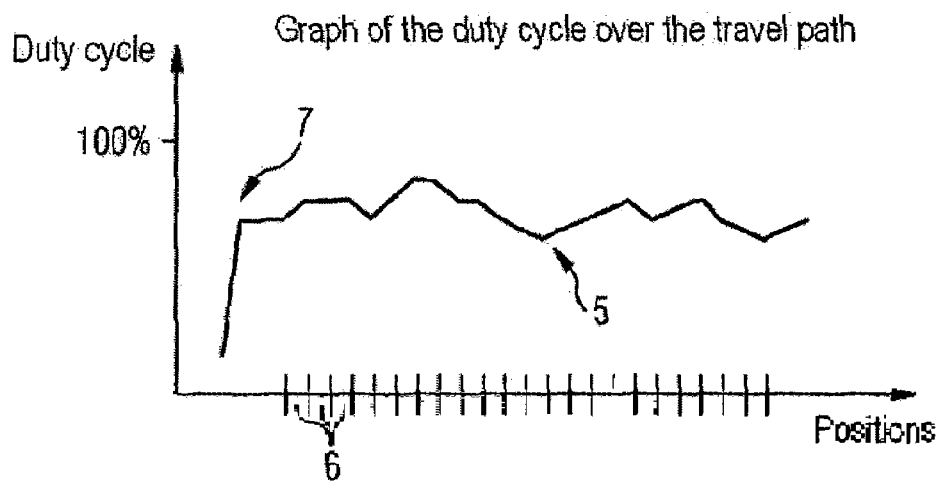

Such a duty cycle characteristic 5 is shown by way of example in FIG. 3. Here the entire path over which the displacement element 4 travels when actuated is subdivided into small sections 6 and within each of these sections 6 an average of the above described duty cycle required is computed. Thus for each position of the displacement element 4 in its displacement path an output value is calculated with which the motor 1 must be controlled in order to overcome the particular frictional resistances while maintaining a constant displacement speed and to move the displacement element 4 to the end position provided. At the end of each section 6, the difference between the current duty cycle value and the previous duty cycle value is stored so that a characteristic 5 is eventually produced from the total number of duty cycle values obtained at the predefined positions.

When the learning run has been completed, it is now the task of the characteristic handler 3, for all future actuations of the displacement element 4, to compare these stored duty cycle values with the current duty cycle values occurring on the relevant sections 6. If a defined permissible deviation from the stored duty cycle characteristic 5 and therefore from the normal case provided by the learning run is exceeded, any obstacle trapped by the displacement element 4 is immediately detected by the characteristic handler 3. In such cases appropriate action is taken by the characteristic handler 3 to eliminate the trapping hazard. This action can be either to stop the motor 1 or reverse is drive motion, and can also include suitable audible or visual signals.

The reference numeral 7 in FIG. 3 relates to the starting position for the comparison of the current duty cycle with the duty cycle characteristic 5.

During all the closing movements of the displacement element 4 following the learning run, it is also the task of the PID controller to keep the speed constant. Whereas with known methods according to the prior art the necessary displacement force required by the motor 1 to move the displacement element 4 is calculated via the voltage and speed of the motor 1 and compared with stored displacement forces, in the system according to the invention any such displacement force calculation is no longer necessary, as the PID controller continuously monitors the speed of the motor 1.

The duty cycle produced by the open-loop control unit 2, which is created on the basis of the closed-loop control unit 9, can now be compared directly with the duty cycle characteristic obtained in the learning run.

In this way, even after mechanical alteration as the result of aging or changing operating conditions, a desired characteristic of the displacement element 4 can always be approximated accordingly.

Now the trapping sensitivity can be adjusted using the PID controller via the accuracy of the speed control system.

The reliable speed regulation is accompanied by a more acceptable (because more uniform) closing noise of the displacement element 4.

LIST OF REFERENCE NUMERALS USED

1 Motor
2 Open-loop control unit
3 Characteristic handler
4 Displacement element
5 Duty cycle characteristic
6 Sections
7 Starting position
8 Square-wave signal
9 Closed-loop control unit
10 Memory

What is claimed is:

1. A method for controlling a displacement element such as a vehicle window, a sunroof, a lift gate, a vehicle door or the like by means of a motor, the method comprising the step of:
   comparing parameter values which are stored by means of a learning run with parameter values generated in real-time during operation of the motor and,
   depending on the result of the comparison, stopping the motor or reversing the motor rotational direction,
   wherein the speed of the motor is kept constant allowing for the mechanical forces actually occurring on the displacement element at the time of motor actuation and the parameter values generated in real-time are the result of closed-loop speed control causing the speed to remain constant and are used for controlling the motor.

2. A method according to claim 1, wherein the motor is a DC motor.

3. A method according to claim 1, wherein the parameter values are in the form of a characteristic curve.

4. A method according to claim 1, wherein the parameter values generated in real-time are the ratio of the on-time of the motor to the off-time of the motor.

5. A method according to claim 1, wherein, if a defined difference between the stored parameter values and the parameter values generated in real-time is exceeded, the motor is stopped and its drive motion is preferably put into reverse.

6. A method according to claim 1, wherein the parameter values stored by means of a learning run are the ratio of the on-time of the motor to the off-time of the motor.

7. A method according to claim 1, wherein the speed of the system is maintained constant throughout the learning run.

8. An apparatus for controlling a displacement element such as a vehicle window, a sunroof, a lift gate, a vehicle door or the like by means of a motor, an open-loop control unit for motor clocking and a characteristic handler as well as a nonvolatile memory in which parameter values obtained in the course of a learning run are stored, wherein the open-loop control unit is preceded by a closed-loop control unit which causes the motor to operate at constant speed, the characteristic handler continuously comparing the parameter values of the open-loop control unit that are critical for motor control with the parameter values stored in the nonvolatile memory.

9. An apparatus according to claim 8, wherein the motor is a DC motor.

10. An apparatus according to claim 8, wherein the parameter values are in the form of a characteristic curve.

11. An apparatus according to claim 8, wherein the closed-loop control unit comprises a PID controller.

12. A method for generating parameter values of a learning run for use in a method according to claim 1, wherein the speed of the motor is kept constant by means of a closed-loop control unit, preferably a PID controller.

13. A method according to claim 12, wherein the travel path of the displacement element is subdivided into a plurality of sections within which an average of the parameter values required for controlling the motor while its speed is maintained constant is calculated, the difference between the current parameter value and the previously stored parameter value being stored in the nonvolatile memory at the end of the section.

14. A method according to claim 13, wherein the totality of all the stored parameter values is stored as a characteristic in the nonvolatile memory.

15. A method according to claim 13, wherein the parameter values are the ratio of the on-time of the motor to the off-time of the motor.

16. A method for generating parameter values of a learning run for use in an apparatus according to claim 8, wherein the speed of the motor is kept constant by means of a closed-loop control unit, preferably a PID controller.

17. A method according to claim 16, wherein the travel path of the displacement element is subdivided into a plurality of sections within which an average of the parameter values required for controlling the motor while its speed is maintained constant is calculated, the difference between the current parameter value and the previously stored parameter value being stored in the nonvolatile memory at the end of the section.

18. A method according to claim 17, wherein the totality of all the stored parameter values is stored as a characteristic in the nonvolatile memory.

19. A method according to claim 17, wherein the parameter values are the ratio of the on-time of the motor to the off-time of the motor.

* * * * *